May 25, 1926.
E. A. LYNCH
BUMPER FOR AUTOMOBILES
Filed Oct. 6, 1925
1,586,096
2 Sheets-Sheet 2
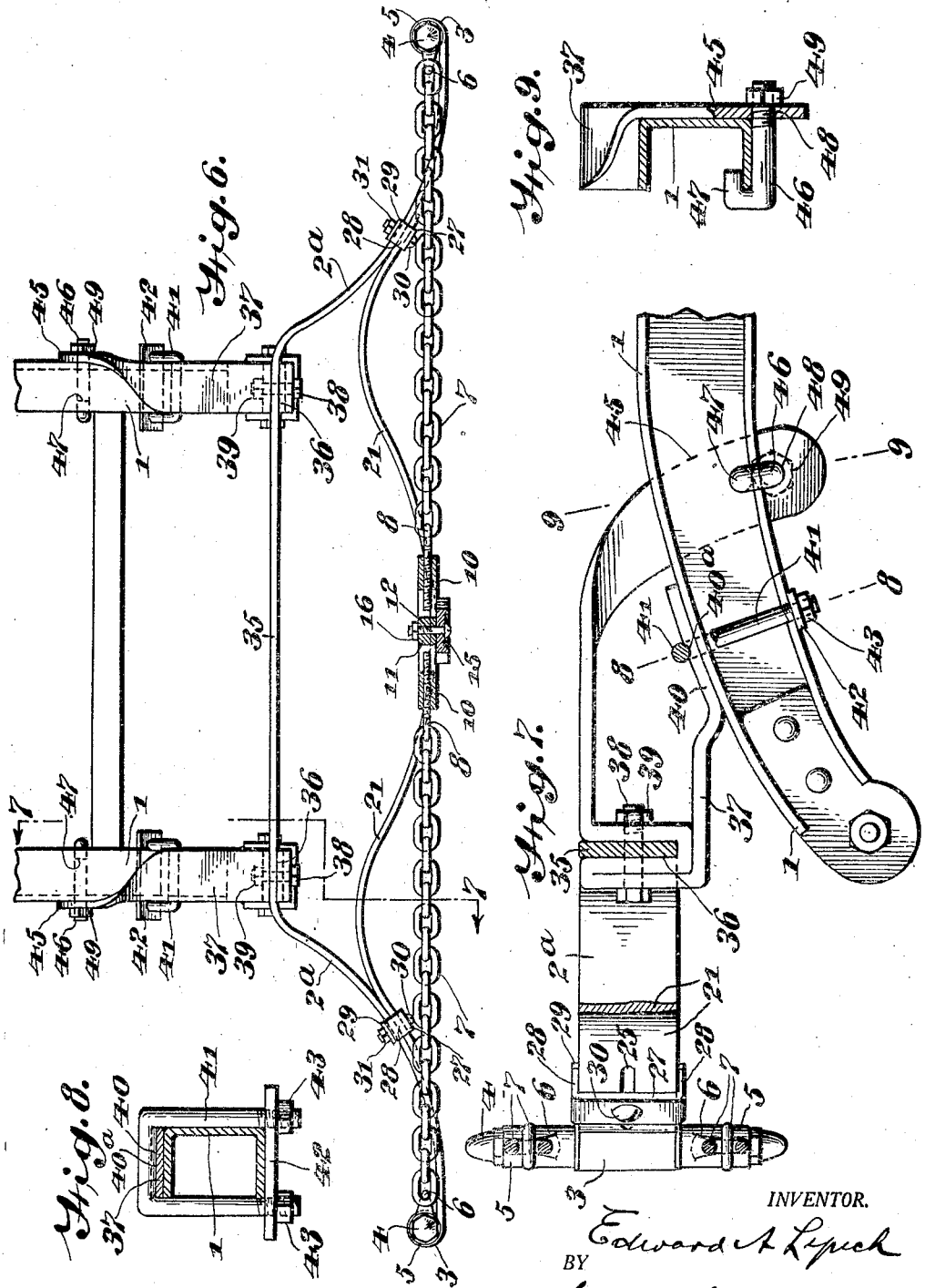
INVENTOR.
Edward A. Lynch
BY
Cyrus N. Anderson
ATTORNEY.

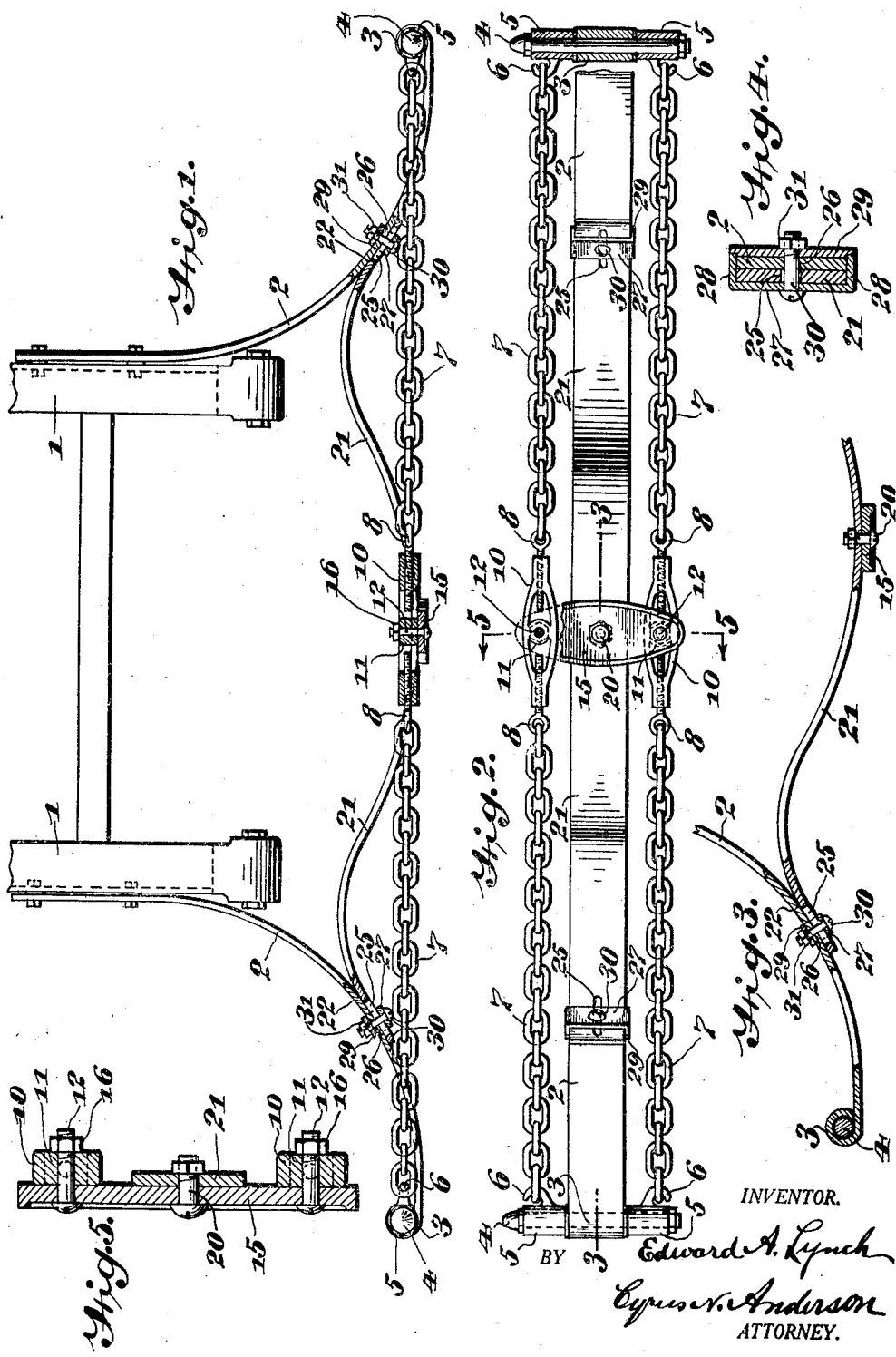

Patented May 25, 1926.

1,586,096

UNITED STATES PATENT OFFICE.

EDWARD A. LYNCH, OF PENFIELD, PENNSYLVANIA.

BUMPER FOR AUTOMOBILES.

Application filed October 6, 1925. Serial No. 60,710.

My invention relates to bumpers for automobiles or other vehicles which require the protection afforded by such structures.

The general object of the invention is to provide a bumper of novel construction embodying both simplicity and great efficiency in the protection of automobiles or other vehicles in case there should be collision.

It is also an object of the invention to provide a novel construction of bumper device comprising resilient flexible means and articulated non-resilient means combined in a novel manner to provide an efficient bumper device for automobiles or other vehicles.

Another object of the invention is to provide a bumper for automobiles or other vehicles comprising laterally disposed spring supporting members and a crosswise resilient spring member having slidable connection at its opposite ends with the laterally disposed spring members and also having articulated means connected and combined therewith in a novel manner to cooperate therewith and increase the protective efficiency of the bumper.

To these and other ends my invention comprehends the construction and arrangement of parts as hereinafter described in the specification and particularly pointed out and defined in the claims, and also as illustrated in the accompanying drawings in which I have shown certain convenient forms of mechanical embodiment of the invention.

It is to be understood that the invention is susceptible of embodiment in other forms of construction than those shown and that changes in the details of construction may be made within the scope of the claims without departing from the invention.

In the drawings:

Fig. 1 is a top plan view of the end portions of the chassis of a vehicle such as an automobile having mounted thereon a bumper embodying my invention, the said bumper being shown partly in top plan and partly in horizontal sectional view;

Fig. 2 is a view in front elevation of the bumper device with a portion of a central supporting member broken away and one of the fastening devices being shown in section;

Fig. 3 is a horizontal sectional view taken on the line 3—3 of Fig. 2;

Fig. 4 is a transverse sectional view showing in detail the means for fastening together certain of the elements of the bumper construction;

Fig. 5 is a transverse sectional view taken on the line 5—5 of Fig. 2;

Fig. 6 is a view similar to that of Fig. 1, but showing a modified construction;

Fig. 7 is a transverse sectional view taken on the line 7—7 of Fig. 6;

Fig. 8 is a transverse sectional view taken on the line 8—8 of Fig. 7; and

Fig. 9 is a transverse sectional view taken on the line 9—9 of Fig. 7.

In the drawings the front end portions of the chassis of an automobile or similar vehicle structure are shown at 1. It will be understood that the bumper may be mounted upon the rear end portion of the automobile or other vehicle structure for the purpose of protecting such rear end portion against injury from other automobiles or other structures which might strike the same from the rear.

Referring now to Figs. 1 to 5 of the drawings, it will be noted that laterally curved resilient spring plate members 2 are mounted upon the end portions 1 of the chassis. The said spring plate members 2 flare or curve outwardly and terminate at their outer ends in bent portions forming eyes, as indicated at 3. Mounted within and supported by these eyes are shackle bolts 4 upon the upper and lower ends of which shackle sleeves 5 are mounted. These sleeves are provided respectively with hooks 6 which engage the outer links of sections of chain 7. The inner links of said sections are each provided with eye-bolts 8, which bolts are screw-threaded, as shown, to engage the screw-threaded opposite end portions of turnbuckles 10. These turnbuckles are of usual construction, except that the opposite side portions thereof are connected at their middles by means of webs 11 which are provided with openings through which bolts 12 extend. These bolts are employed for the purpose of fastening the upper and lower ends of a supporting and tying member or block 15 to the said turnbuckle. The said block is provided with openings, as shown, through which the bolts 12 extend. The said bolts having been inserted through the openings in the upper and lower ends of the block 15 and through the openings in the webs 11 of the turnbuckles 10 are secured in place by means of nuts 16.

Before securing the member 15 to the turnbuckles 10 the latter may be turned to adjust the combined length of the sections 7 of chain secured together thereby, for the purpose of varying the tightness or tautness of the said chains due to their pull upon the hooks 6.

The supporting and tying block 15 is provided with an opening at its center for the reception of a bolt 20 by means of which the central portion of a reversely curved more or less sinuous resilient spring plate 21 is secured to the said block or tying member. It will be noted that the middle portion of the resilient spring plate 21 is curved forwardly or outwardly, while the portions thereof near its opposite ends are curved or bent inwardly and that the outer end portions thereof extend outwardly and are seated or lie against the inner sides of the supporting resilient spring plates 2, as indicated at 22. The outer end portions of the plate 21 which rest or lie against the spring supporting plates 2 are provided with elongated longitudinally extending slots 25 which register with holes 26 in the oppositely disposed resilient spring plates 2.

For the purpose of slidably connecting the opposite outer end portions of the plate 21 with the supporting resilient spring plates 2 a short plate 27 is bent at its opposite ends to provide short portions 28 which are adapted to extend over the opposite edges of the plates 21 and 22. Cooperating with the said plate 27 is a plate 29 which is located upon the outer sides of the plates 22 opposite the plate 27. The plates 27 and 29 are provided with holes which are in registry with the holes 26 through the supporting plates 2. Bolts 30 extend through the said holes and through the slots 25 and are retained in position by nuts 31. By reason of the presence of the slots 25 in the outer end portions of the plate 21 it will be apparent that the outer end portions of the latter may slide upon the bolts 30 with respect to the plates 2.

Referring now to Figs. 6 to 9 inclusive, it will be noted that a resilient spring plate 35, the opposite ends of which extend laterally and outwardly, as indicated at 2ª, takes the place of the laterally disposed supporting plates 2. The plate 35 is supported in sockets 36 formed in the outer end portions of brackets 37. The said plate is secured to the said brackets by means of bolts 38 held in place by nuts 39. The brackets comprise plate members bent, as best shown in Fig. 7 of the drawings. One end portion of each of the plates forming the brackets 37 is adapted to lie upon the upper edge of one side of a chassis frame, as indicated at 40. The upper sides of said portions are provided with notches 40ª, as shown. The said end portions are adapted to be secured in such position by means of clevis-like members 41 which are adapted to engage the said end portion and the sides of the chassis, as illustrated. Cross-bars of said members 41 engage the said notches 40ª. The ends of the opposite sides of each of the clevis-like members 41 extend through a bar or plate 42 against which securing nuts 43 are seated for the purpose of binding and holding the clevis-like member 41 against the end portion 40 of the bracket. The opposite end portion of each of the brackets 37 is given a half twist so that it is adapted to pass down along the outer side of a chassis, as shown at 45. The said last mentioned end portion of each of the brackets is adapted to be secured to the adjacent chassis member by means of hook bolts 46, the hooks of which engage the inner edge of a flange of the adjacent chassis, as indicated at 47. The opposite screw-threaded end of each bolt extends through an opening 48 through the adjacent end of the bracket and is engaged by a nut 49 by means of which the said end is bound against the outer side of a chassis member.

The remaining portions of the structure shown in Figs. 6 to 9 inclusive, designated 3, 4, 5, 6, 7, 8, 10, 11, 12, 15, 16, 20, 21, 22, 25, 26, 27, 28, 29, 30 and 31 are identical with the parts correspondingly numbered in Figs. 1 to 5 of the drawings and need not be further described.

If a bumper embodying my invention should receive an impact due to a collision or any other cause the chains would first receive the force of the impact and would exert a pull upon the opposite resilient spring members 2 or 2ª. During the same period, or simultaneously, inward pressure due to the connection between the middle portions of the chains and the reversely curved resilient spring plate 21 would be exerted by the chains upon the said resilient spring member 21. Inward pressure against the central portion of the said spring member would tend to cause the same to straighten, thereby causing its opposite end portions to exert outward pressure against the opposite side supporting members 2 or 2ª, as the case might be. In the action of straightening out the slots 25 in the opposite ends of the resilient spring plate member 21 would slide upon the bolts 30. Outward pressure of the opposite end portions of the resilient spring member 21 against the said resilient spring supporting members 2 or 2ª would be resisted by the chains previously referred to.

By the employment of a bumper embodying my invention a greater flexibility and a more desirable cushioning effect is obtained in case of impact against the bumper than is the case of bumpers of the construction heretofore in use, as far as I am aware. A bumper embodying my invention operates to absorb the shock incident to a sudden blow or impact more gradually than is the case with bumpers of the construction now used or heretofore in use in so far as I am aware.

I have shown two different methods or means by which the bumpers may be supported upon either the front or rear end portion of an automobile or other vehicle structure and it is to be understood that any other suitable means may be employed without departing from my invention. It is also to be understood that other arrangements of the articulated members consisting of the chains and the resilient spring plate members may be employed, provided that upon receiving an impact at any point inwardly of the opposite ends of the resilient spring member 21 the tendency is for the latter to straighten out, such tendency operating to exert outward pressure upon the oppositely disposed supporting members 2 or 2ª, while movement of the latter outwardly is resisted by the articulated members of the structure.

Having thus described my invention, what I claim and desire to secure by Letters Patent is:

1. In a bumper, the combination of resilient spring members located at the opposite ends thereof, a crosswise extending spring plate having slidable connection at its opposite ends with the said resilient spring members, and articulated members having connection at their outer ends with the said oppositely disposed resilient spring members.

2. In a bumper for automobiles, the combination of outwardly and laterally extending spring members mounted upon opposite side portions of the automobile structure, a crosswise extending resilient spring member having slidable connection with the oppositely disposed spring members, and articulated members having connection at their outer ends with the said oppositely disposed spring members and at their middle portions with the said crosswise extending spring member.

3. In a bumper for automobiles, the combination of oppositely disposed resilient spring supporting members adapted to be supported upon the opposite sides of an automobile structure, the said members extending outwardly and laterally from their points of support, a resilient spring member extending between the said oppositely disposed spring supporting members, the middle portion of said member being curved outwardly and the portions thereof adjacent its opposite ends being curved inwardly and then outwardly, means for slidably connecting the opposite ends of said spring member with the oppositely disposed spring supporting members, articulated means having connection at its outer ends with the said oppositely disposed spring supporting members, and means for connecting the middle portion of said articulated means to the said spring member, substantially as described.

4. In a bumper for automobiles, the combination of oppositely disposed outwardly and laterally resilient spring supporting members, a crosswise extending reversely curved resilient spring member having slidable connection at its outer ends with said spring supporting members, the said spring supporting members being provided with bolts at their outer ends, hooks mounted on said bolts, chains having their outer links in engagement with said hooks, means for adjusting the lengths of said chains, and means for connecting the middle portions of said chains to the said reversely curved resilient spring member, substantially as described.

5. In a bumper for automobiles, the combination of oppositely disposed outwardly and laterally extending resilient spring supporting members, a crosswise extending reversely curved resilient spring member, means for slidably connecting the outer ends of said member to the said spring supporting members, an articulated member having detachable connection with the outer ends of the said spring supporting members, means for adjusting the length of the said articulated member to place the same together with the spring members under tension, and means for detachably connecting the central portion of the articulated member to the central portion of the said reversely curved spring member.

6. In a bumper, the combination of oppositely disposed resilient spring supporting members extending laterally and outwardly from the opposite sides of one end portion of an automobile structure, a crosswise extending curved spring member having slidable connection at its opposite ends with the said spring supporting members, bolts mounted upon the outer ends of said spring members, sleeves provided with hooks mounted upon said bolts, chains having their opposite ends in engagement with the said hooks, turnbuckles constituting the middle portions of said chains, the said turnbuckles being adapted to be rotated to effect variation of the lengths of said chains, whereby the said chains and the said spring members may be placed under tension, means for connecting the turnbuckles of the respective chains together, and means for connecting the last mentioned means to the said crosswise extending spring member.

7. In a bumper for automobiles, the combination of brackets supported upon the end portions of the opposite sides of an automobile structure, a spring bar secured to and supported by the said brackets, the outer end portions of said bar extending laterally and outwardly to form resilient spring supporting means, a curved resilient spring plate located outwardly with respect to the said spring bar and having slidable connection at its opposite ends with the laterally and outwardly extending supporting portions of said bar, articulated members having pivotal connection at their outer ends with the outer ends of the said supporting portions, means for adjusting the length of the said articulated members, and means for connecting the said articulated members to the central portion of the said curved resilient plate.

In testimony that I claim the foregoing as my invention, I have hereunto signed my name this 15th day of Sept., A. D., 1925.

EDWARD A. LYNCH.